(12) United States Patent
Szumera

(10) Patent No.: US 6,257,417 B1
(45) Date of Patent: Jul. 10, 2001

(54) AUTOMOTIVE OIL FILTER HOUSING

(76) Inventor: James A. Szumera, 1 Spring Creek Dr., Denison, TX (US) 75020

( * ) Notice: Subject to any disclaimer, the term of this patent is extended or adjusted under 35 U.S.C. 154(b) by 0 days.

(21) Appl. No.: 09/410,406

(22) Filed: Oct. 1, 1999

(51) Int. Cl.[7] .................................................. B01D 35/34
(52) U.S. Cl. .......................... 210/443; 210/450; 210/453; 210/DIG. 17; 220/322
(58) Field of Search ..................................... 210/440, 443, 210/444, 450, 453, DIG. 17; 220/322, 326, 378, 795; 277/918

(56) References Cited

U.S. PATENT DOCUMENTS

| | | | |
|---|---|---|---|
| 2,631,750 | * 3/1953 | Laucks | 220/378 |
| 3,036,711 | * 5/1962 | Wilhelm | 210/DIG. 17 |
| 3,298,528 | * 1/1967 | Franck | 210/444 |
| 4,228,011 | * 10/1980 | Cote, Jr. | 210/443 |
| 4,298,204 | * 11/1981 | Jinkins | 277/165 |
| 4,473,471 | * 9/1984 | Robichaud et al. | 210/443 |
| 5,078,877 | * 1/1992 | Cudaback et al. | 210/450 |
| 5,762,788 | * 6/1998 | Gullett | 210/450 |

* cited by examiner

Primary Examiner—Matthew O. Savage

(57) ABSTRACT

A housing for an automotive oil filter element has a cylindrical wall closed at one end by an integral base; the base includes a standard-sized threaded orifice for mating the housing to an existing lubricating-oil connection on an engine. Another end of the housing is closed by a removable end cap held in place against the housing by a spring clamp which is pressed into engagement with locking lugs spaced around an outer perimeter of the housing. A gasket having two sealing surfaces forms a seal between end cap and housing. Pushing the shoulders of the spring clamp toward the cap causes the ends of the spring clamp to be moved outward by a ramped band, disengaging the clamp ends from the locking lugs and allowing the clamp ends to be pulled outward, releasing the end cap for removal.

4 Claims, 3 Drawing Sheets

(VIEW 3-3)

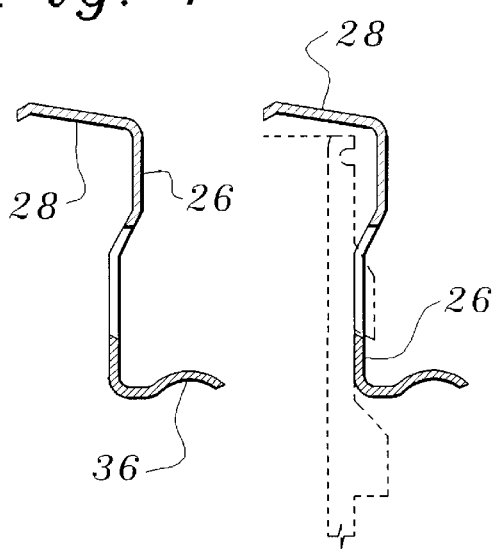
Fig. 4
Fig. 5
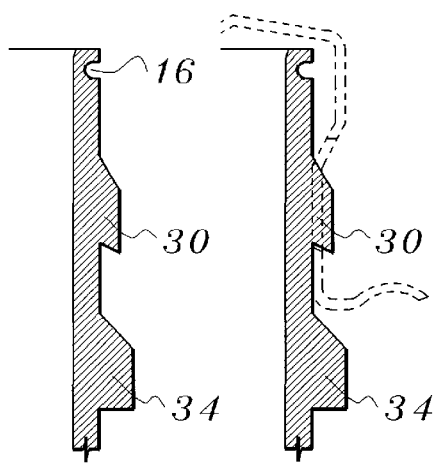
Fig. 6
Fig. 7
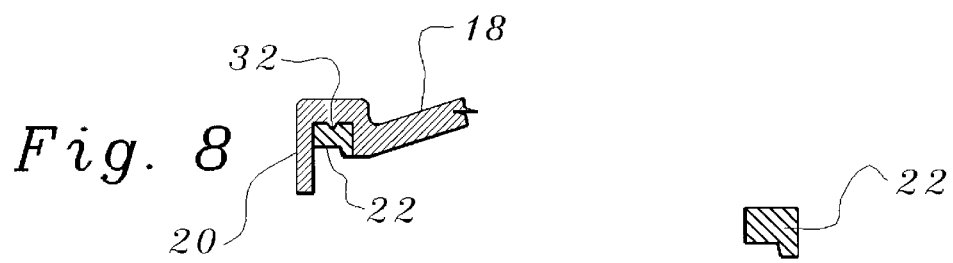
Fig. 8
Fig. 9
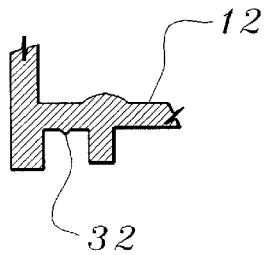
Fig. 10

AUTOMOTIVE OIL FILTER HOUSING

CROSS REFERENCE TO RELATED APPLICATIONS

Not Applicable.

BACKGROUND OF THE INVENTION

1. Field of the Invention

This invention relates to housings or containers for automotive oil filters, particularly to such housings designed for permanent or long-term installation on an engine, and having a removable end cap to facilitate replacement of an oil filter element.

2. Description of the Related Art

Most automotive oil filters currently on the market include a paper filter element enclosed within an integral metal container; the container includes a metal base for attaching the assembly to an engine. When such a filter is replaced, disposal and recycling are complicated by the metal parts, which require special equipment for crushing, etc. Disposal, including reclamation of oil contained within the used filter, is much simplified when only the paper filter element requires recycling.

Previous efforts to provide a housing for a replaceable filter include those described by Brown et al. in U.S. Pat. No. 5,738,785; by Ernst et al. in U.S. Pat. No. 5,695,633; and by Brieden et al. in U.S. Pat. No. 5,516,425. Each of the patents referred to discloses a housing having a screw-on cap or cover. What is needed, therefore, is an oil filter housing with a cap that does not require a threaded assembly, and which may be quickly and easily removed and replaced during oil changes.

SUMMARY OF THE INVENTION

The present invention solves the problems outlined in the preceding section by providing a filter housing which replaces a standard oil filter unit. Installed on an engine and left in place, the housing allows only the paper filter element to be replaced. Because filters currently in use have an integral metal housing, the new housing simplifies recycling; i.e., only the paper filter element requires disposal when the engine oil and filter are replaced.

Mounted to an engine in the same way as a standard disposable oil filter, the invention includes a cylindrical housing or container for a paper filter element. The housing's base is threaded onto an engine in the same way as a disposable can-type oil filter, and a removable end cap allows easy replacement of the filter element. Costs are reduced because only the paper element is replaced, while the metal housing remains in place on the engine.

The invention includes a filter housing with a base at one end; the base has a threaded orifice for mounting the housing on an engine. A cap or cover with an attached spring clamp closes the end of the housing through which the filter element is inserted. Arms on the spring clamp extend alongside the housing wall, and engage locking lugs on the perimeter of the wall to hold the cover in place. A band with a ramped surface surrounds the housing adjacent the locking lugs; when the spring arms are pushed against the ramp, the clamp arms are forced outward, disengaging the locking lugs so the cover can be easily removed. An effective seal is provided between cover and housing by a gasket having two sealing surfaces.

In view of the above, it is an object of this invention to provide an oil filter housing which eliminates can-type filters and allows replacement of the filter element only.

A further object is to provide a housing for standard internal oil filter elements now used in the automotive filter industry.

Another object is to provide a filter housing which facilitates replacement of an oil filter and eliminates recycling of can-type filters.

Another object is to provide a filter housing which reduces costs by allowing replacement of the paper filter element only.

Further objects are to achieve the above with a device that is compact, durable, simple, efficient, and reliable, yet inexpensive and easy to install.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS:

FIG. 4 is a cross section detail of a spring clamp arm.

FIG. 5 is a cross section detail of a spring clamp arm showing the clamp arm locked in place over a locking lug.

FIG. 6 is a cross section detail of the filter housing wall showing a locking lug and the ramped band.

FIG. 7 is a cross section detail of the filter housing wall showing a locking lug and ramped band, with a spring clamp arm in place over the locking lug.

FIG. 8 is a cross section detail of the housing cover perimeter, showing the gasket groove and gasket spreader.

FIG. 9 is a cross section of a circular gasket having two sealing surfaces.

FIG. 10 is a cross section detail of the housing base perimeter, showing the gasket groove and gasket spreader.

CATALOG OF THE ELEMENTS

Figure 1:
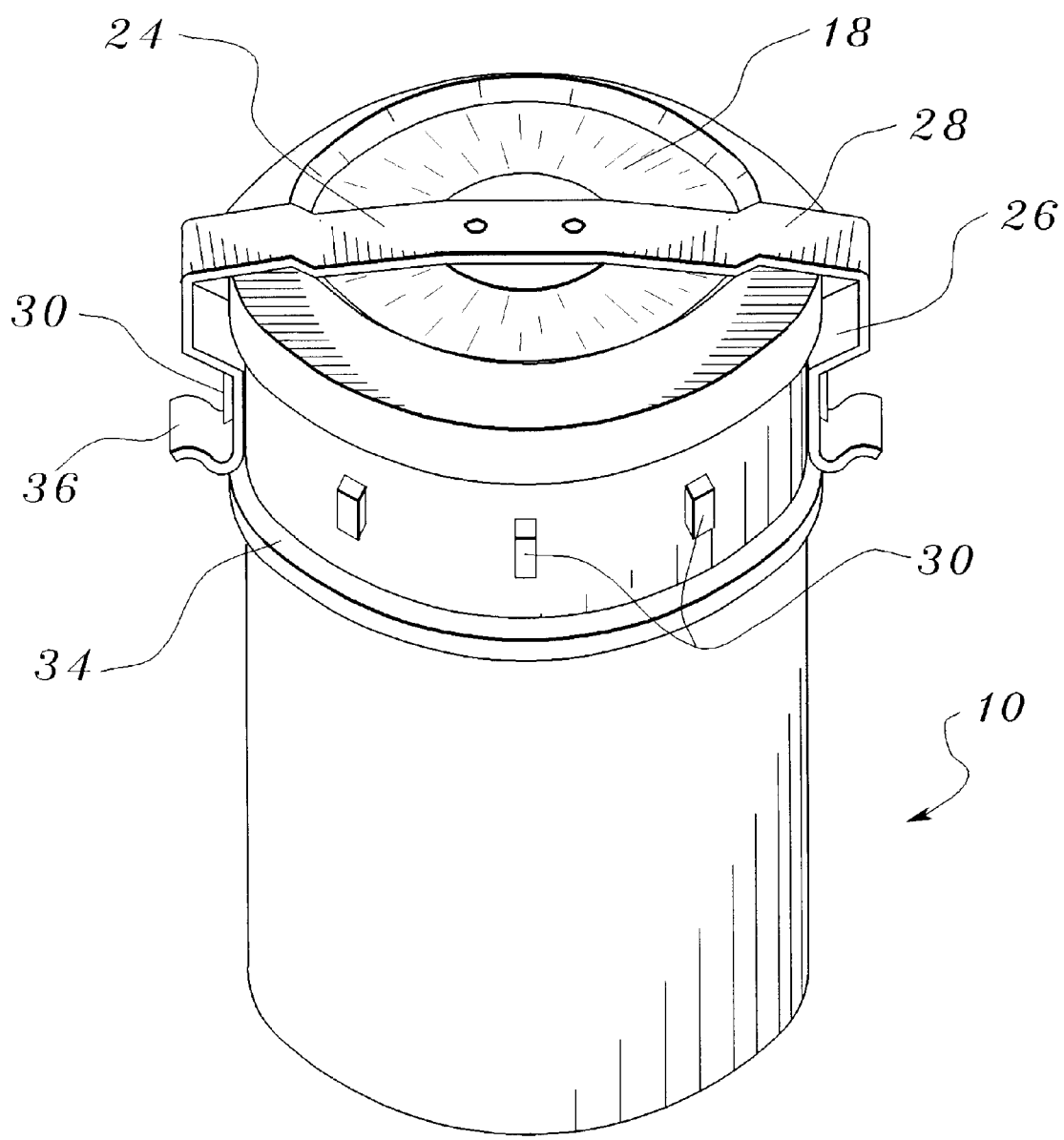
FIG. 1 is a front perspective view of the filter housing and cover.

To aid in the correlation of the elements of the invention to the exemplary drawings, the following catalog of the elements is provided:

10 oil filter housing
12 base
14 rubber skirt
16 O-ring
18 end cap
20 end cap flange
22 end cap gasket
24 spring clamp
26 spring clamp arm
28 spring clamp shoulder
30 locking lug
32 gasket spreader
34 ramped band
36 finger grip

DESCRIPTION OF THE PREFERRED EMBODIMENTS

Figure 2:
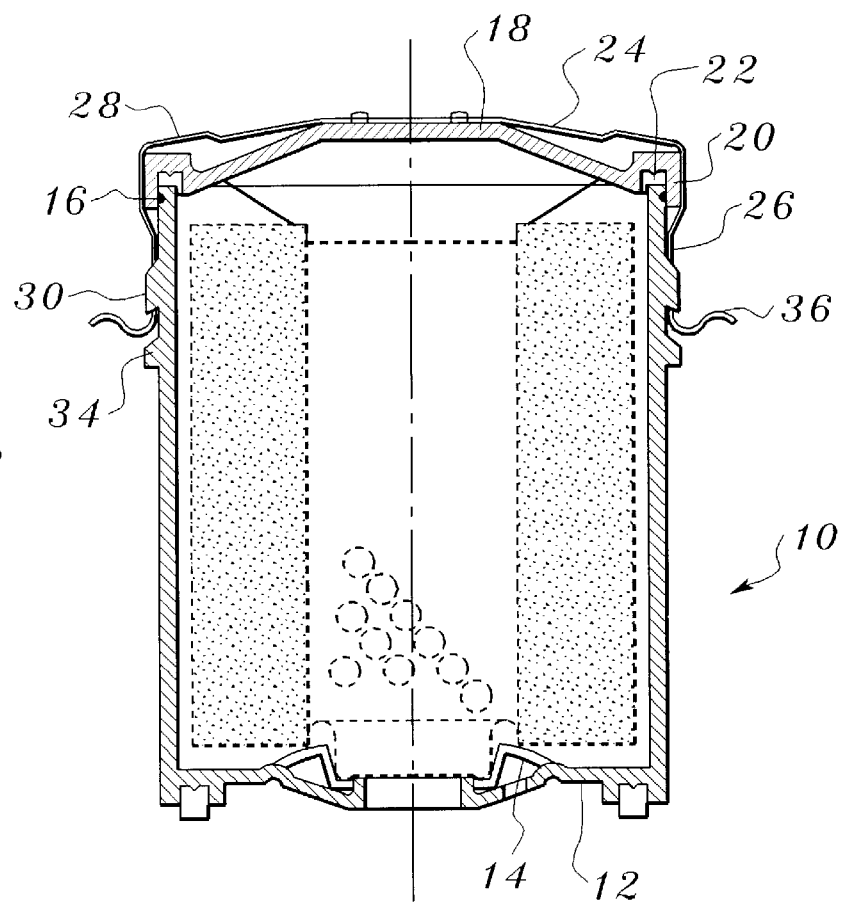
FIG. 2 is a cross section of the housing and cover, on view 1—1 of FIG. 3.
Figure 3:
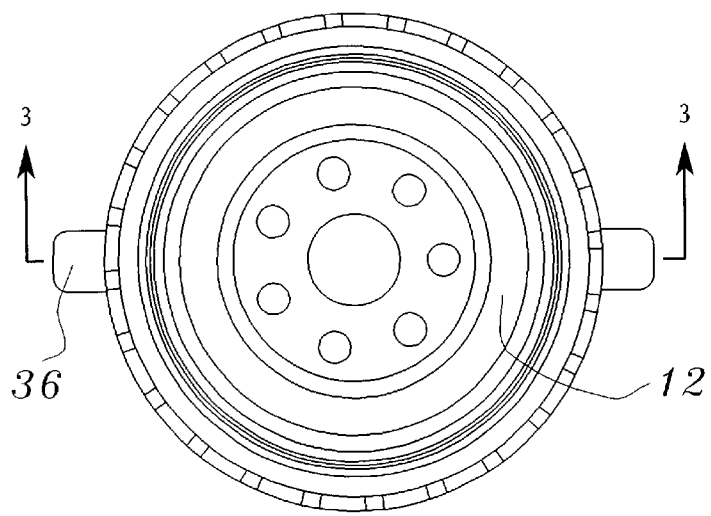
FIG. 3 is a bottom plan view of the housing base.

Referring now to the drawings, FIG. 1 illustrates a housing 10 for an oil filter element; FIG. 2 is a cross section of the housing on view 1—1 of FIG. 3. In the preferred embodiment housing 10 is cylindrical, but may be octagonal or some other shape. Housing 10 has internal dimensions to receive and enclose a standard oil filter element; such filter elements are made primarily of paper products, and include a lightweight central stiffener of thin sheet metal. The housing is produced in a variety of sizes to accommodate different sizes of filter elements. Preferably cast of metal such as aluminum, zinc, or magnesium, the housing may also be cast of high-impact, heat-resistant plastic.

Base 12 closes one end of the cylindrical housing. In the center of base 12 is a threaded orifice which mates to a threaded lubricating-oil connector on an engine. Surrounding the engine's threaded connector, through which oil returns to the engine from the filter, are a series of concentric orifices. Around the concentric orifices is a flat surface; when the housing base is screwed onto the engine oil connector, a gasket on the housing base is compressed against the flat surface to form a seal. An oil pump in the engine forces oil through the concentric orifices into housing 10.

Inside the housing, oil is diverted into the filter element by a resilient rubber skirt 14, as shown in FIG. 2. Rubber skirt 14 surrounds the central oil connector and extends outward therefrom; an inner opening in skirt 14 fits tightly about the central threaded orifice, while an outer perimeter of the resilient skirt contacts an inner surface of base 12. The configuration of skirt 14 prevents oil from passing directly from the concentric orifices back into the oil return passage. A space between the housing wall and the filter element forms a passage through which oil may travel to any part of the paper filter element. Oil is filtered as it flows through the element to a central opening in the element, and from there flows back into the engine through the central threaded connector.

A cylindrical wall of housing 10 is integral with and extends from base 12. End cap 18 closes and seals an outer end of housing 10. A flange 20 of end cap 18 extends over and around the outer end of housing 10. Gasket 22 fits into a groove formed within flange 20, and is compressed against the end of housing 10, forming a seal. Gasket 22 includes two sealing surfaces; the surfaces are formed by a notch in gasket 22, so that one gasket surface bears against the rim of housing 10, and another gasket surface bears against the inner circumference of housing 10, adjacent the rim. "Rim," as used herein, means the extremity or terminal edge of the housing wall. The function of the gasket is further described below.

End cap 18 is held in position against housing 10 by a spring clamp 24. As shown in FIG. 2, the central portion, or central member, of spring clamp 24 is riveted or otherwise attached to end cap 18. Two arms 26 of spring clamp 24 extend outward from the central member to the outer perimeter of the end cap, where they curve to fit closely around the perimeter of the end cap. The spring clamp arms 26 then curve back slightly toward the wall of housing 10 and are biased toward the housing wall so that the clamp arms 26 bear against the outer surface of the housing wall. Portions of the spring clamp adjacent the right-angle curve (around the end-cap perimeter) are referred to herein as shoulders 28. Extensions on the terminal portion of each arm 26 of the spring clamp are recurved to extend outward from the wall of housing 10 to form finger grips 36 used in removing the end cap from the housing.

A series of ramped locking lugs 30 are spaced around the perimeter of housing 10, as shown in FIG. 1. As seen in the detailed FIGS. 4, 5, 6, and 7, the locking lugs 30 engage orifices in each arm 26 of the spring clamp to hold the clamp securely in place. Each lug 30 has a matching lug on an opposite side of the housing, so that each lug engages an arm of the spring clamp. An angled surface on the distal portion of each locking lug, in cooperation with an outer wall surface of the housing, forms a V-shaped notch which is engaged by a side of the clamp-arm orifice.

To engage the locking lugs, i.e., to lock the end cap in place, the end cap is placed in position on the housing, and thumb pressure is applied to each shoulder 28 of spring clamp 24. Sufficient force is applied to the shoulders 28 to bend the spring clamp, moving clamp arms 26 along the housing wall. Each spring clamp arm rides up a lug ramp until the orifice in the clamp arm allows the clamp arm to drop over the lug. Pressure on the clamp shoulders is then released, and as the resilient spring clamp relaxes back toward its original position a side of the orifice in the clamp arm engages the notch formed by the angled surface on the lug, latching the clamp in place. The result is that the end cap 18 is firmly held by tension on the spring clamp against an end of housing 10, and gasket 22 is compressed between the end cap and the rim of the housing, forming a seal.

A more effective seal is provided by the geometry of gasket 22. As mentioned above, the gasket has two sealing surfaces. A detail of the gasket's cross section is shown in FIG. 10. One gasket surface is pressed directly against the rim of housing 10, while a flange portion of the gasket is pressed against the inner surface of the housing, adjacent the housing end. As seen in FIG. 2, end cap 18 has a generally convex shape, with its central portion raised relative to its perimeter. When the spring clamp is pushed into engagement with the locking lugs, force is exerted by the spring clamp against the center of the end cap, toward the housing. This force tends to flatten the end cap, pushing the perimeter of the end cap outward against the gasket and compressing the flange portion of gasket 22 against the inner surface of the housing wall. A redundant seal is provided by O-ring 16, disposed in a separate groove in the housing wall as shown in FIG. 2.

Another feature ensuring a superior seal between end cap and housing is gasket spreader 32, shown in FIG. 8. Gasket 22 seats in a groove which is defined by the perimeter flange 20 around the end cap. Gasket spreader 32 is an integral ridge, triangular or semi-circular in cross section, extending around the bottom surface of the end cap groove. An apex of the ridge faces toward the gasket and is pressed into the gasket when end cap 18 is installed. The sloping sides of gasket spreader 32 press against and distend the resilient material of the gasket, compressing it against the groove walls to form a tighter seal. A similar spreader, shown in FIG. 9, is located in the gasket groove in the housing base.

To remove the end cap from the housing, force is applied by a user's thumbs to the shoulders 28 of spring clamp 24. Sufficient force is applied to the clamp arm shoulders to bend the spring clamp, causing the clamp arms to move along the side of housing wall 10. As shown in FIG. 2 and FIG. 7, an outward-curving portion of each clamp arm encounters a ramped band 34 extending around the perimeter of the housing wall. Ramped band 34 includes an inclined ramp surface on a side adjacent the series of locking lugs. Riding up the ramp surface causes each end of the spring clamp to be forced away from the housing wall and out of engagement with the locking lugs 30. Recurved finger grips 36 on each end of the clamp arms are then grasped by a user's finger to hold the clamp arms away from the housing wall, allowing the end cap 18 to be lifted from the housing and removed.

A filter element in housing 10 is centered within the housing and held in position by two retainers, which are stamped from thin sheets of resilient metal. As shown in FIG. 2, one retainer is affixed to the interior of base 12, and is shaped to engage the central opening in a filter element. The second retainer is attached to end cap 18, and fits into the other end of the filter's central opening; together the retainers hold the filter element in position inside the housing.

With the filter housing installed, changing an oil filter element is accomplished by first pushing on the spring clamp shoulders to disengage the clamp, allowing the cap to be lifted off the housing. The old filter element is removed for recycling, a new filter inserted in its place, and the end cap is replaced by positioning it on the open end of the housing and pressing on the spring clamp shoulders until the clamp arms engage the locking lugs, securing the end cap in place.

The restrictive description and drawings of the specific examples above do not point out what an infringement of this patent would be, but are to enable one skilled in the art to make and use the invention. Various modifications can be made in the construction, material, arrangement, and operation, and still be within the scope of my invention. The limits of the invention and the bounds of the patent protection are measured by and defined in the following claims.

I claim as my invention:

1. A housing for an automotive filter, comprising:
    a housing to receive an oil filter element, said housing having a first end and a second end;
    an integral base on said first end of said housing;
    said base having a threaded orifice therein for mating said housing to a lubricating oil connector on an engine;
    housing walls extending from said base to form a container for an oil filter;
    a removable end cap to close said second end of said housing;
    means for securing said end cap to said housing including a spring clamp having a central member and two or more clamp arms, said clamp arms extending from said central member and substantially perpendicular to said central member, said clamp arms being biased toward said housing wall, means for attaching said central member to an outer surface of said end cap, means for latching said clamp arms to said housing including each said clamp arm having an orifice in a portion thereof adjacent to said housing wall, a plurality of ramped lugs spaced around a perimeter of said housing, each said lug having a ramped surface on a portion thereof proximal to said second end of said housing, each said lug having a matching lug on an opposite side of said housing, an angled surface on a distal portion of each said lug forming a notch in cooperation with said housing wall to engage a side of said orifice in said damp arm so that said clamp arm is latched to said lug, a ramped band integral with said housing and extending around a perimeter of said housing, said ramped band being adjacent said plurality of ramped lugs, and an inclined surface on said ramped band to lift said clamp arms away from said housing and out of engagement with said ramped lugs when said clamp arms are pushed onto said ramped band.

2. The invention as described in claim 1, wherein said housing is cylindrical.

3. The invention as described in claim 1, further comprising:
    said end cap having a groove around a perimeter thereof to receive an end of said housing,
    a compressible gasket disposed within said groove, said gasket having a first sealing surface and a second sealing surface,
    said first sealing surface being compressed against a rim of said housing wall, and
    said second sealing surface being compressed against an inner surface of said housing wall.

4. The invention as described in claim 3, further comprising:
    a gasket spreader in said groove,
    said gasket spreader being an integral ridge on a lowermost surface of said groove,
    said ridge having at least one surface which engages and deforms said gasket, causing
    said gasket to be pressed firmly against surfaces of said groove to form a secure seal.

* * * * *